United States Patent
Sohmshetty et al.

(10) Patent No.: US 11,813,737 B2
(45) Date of Patent: *Nov. 14, 2023

(54) ROBOTIC ARM WITH A DETACHABLE AND MOBILE END-EFFECTOR

(71) Applicant: Ford Global Technologies, LLC, Dearborn, MI (US)

(72) Inventors: Raj Sohmshetty, Canton, MI (US); David Jeffeory Berels, Plymouth, MI (US); Anthony Mario D'Amato, Canton, MI (US); Jianbo Lu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/514,224

(22) Filed: Oct. 29, 2021

(65) Prior Publication Data

US 2022/0048204 A1 Feb. 17, 2022

Related U.S. Application Data

(63) Continuation of application No. 16/372,853, filed on Apr. 2, 2019, now Pat. No. 11,312,025.

(51) Int. Cl.
| | |
|---|---|
| G05B 15/00 | (2006.01) |
| G05B 19/00 | (2006.01) |
| B25J 15/04 | (2006.01) |
| B25J 13/08 | (2006.01) |
| B25J 15/00 | (2006.01) |
| B25J 13/00 | (2006.01) |

(52) U.S. Cl.
CPC ......... *B25J 15/0441* (2013.01); *B25J 13/006* (2013.01); *B25J 13/088* (2013.01); *B25J 15/0019* (2013.01)

(58) Field of Classification Search
CPC .... B25J 15/0441; B25J 13/006; B25J 13/088; B25J 15/0019; B25J 5/00; B25J 15/04; B25J 9/06
See application file for complete search history.

(56) References Cited

U.S. PATENT DOCUMENTS

| | | | |
|---|---|---|---|
| 11,235,890 B1 * | 2/2022 | Dahlstrom | B05C 11/1005 |
| 2012/0035434 A1 * | 2/2012 | Ferren | A61B 5/4839 |
| | | | 600/301 |
| 2014/0027689 A1 * | 1/2014 | Spijker | G02B 6/508 |
| | | | 254/134.3 FT |
| 2014/0054525 A1 * | 2/2014 | Spijker | G02B 6/4463 |
| | | | 254/134.3 R |
| 2015/0217443 A1 * | 8/2015 | Tadayon | F24S 50/20 |
| | | | 901/41 |
| 2017/0057080 A1 * | 3/2017 | Krohne | B25J 11/005 |

* cited by examiner

*Primary Examiner* — Harry Y Oh
(74) *Attorney, Agent, or Firm* — Burris Law, PLLC

(57) ABSTRACT

A robotic system includes a robotic arm, a robotic end-effector detachably coupled to the robotic arm, and a control system. The robotic end-effector includes a locomotion device to move the robotic end-effector independent of the robotic arm, and the control system configured to control the robotic arm and the robotic end-effector to detach and attach the robotic arm and the robotic end-effector.

20 Claims, 4 Drawing Sheets

ROBOTIC ARM WITH A DETACHABLE AND MOBILE END-EFFECTOR

CROSS-REFERENCE TO RELATED APPLICATION

This application is a continuation of and claims the benefit of U.S. application Ser. No. 16/372,853, filed Apr. 2, 2019, and titled "ROBOTIC ARM WITH A DETACHABLE AND MOBILE END-EFFECTOR," the content of which is incorporated herein by reference in its entirety.

FIELD

The present disclosure relates to robotic system, and more particularly to a robotic arm having an end-effector.

BACKGROUND

The statements in this section merely provide background information related to the present disclosure and may not constitute prior art.

In recent years, advancements in robotic systems have included development of robotic arms used for maneuvering and modifying an object, such as vehicle panels, doors, console, floor-pan, etc. The robotic arm typically includes an end-effector that interacts with the object and can have different configurations based on the application of the robotic system. The range of motion of the end-effector is dependent on the robotic arm, and thus, the capabilities and functionality of the end-effector can be limited to the operational limitations of the robotic arm. These and other issues are addressed by the teachings of the present disclosure.

SUMMARY

This section provides a general summary of the disclosure and is not a comprehensive disclosure of its full scope or all of its features.

In one form, the present disclosure is directed to a robotic system that includes a robotic arm, a robotic end-effector detachably coupled to the robotic arm, and a control system. The robotic end-effector is operable independent of the robotic arm to perform an operation, and the control system is configured to control the robotic arm and the robotic end-effector to detach and attach the robotic arm and the robotic end-effector.

In some variations, the robotic end-effector includes a position detector to monitor a position of the robotic end-effector, and the control system is configured to locate the robotic end-effector based on data from the position detector. In some variations, the position detector includes a camera, and the control system is configured to perform a visual process based on the data from the position detector. The visual process includes inspecting an object, detecting an obstacle, identifying one or more objects about the robotic end-effector, or a combination thereof. In some variations, the robotic end-effector includes a locomotion device to move the robotic end-effector independent of the robotic arm. In some variations, the robotic end-effector includes a controller communicably coupled to the control system, and the controller is configured to control the robotic end-effector based on a command from the control system. In some variations, the control system and the robotic end-effector are communicably coupled via a wired communication link, a wireless communication link, or a combination thereof. In some variations, the robotic arm defines an inner channel, and the robotic end-effector is communicably coupled to the control system by way of a cable extending through the inner channel. In some variations, the robotic end-effector includes a power source to provide power to the robotic end-effector.

In one form, the present disclosure is directed to a robotic system that includes a robotic arm, a robotic end-effector detachably coupled to the robotic arm, and a control system. The robotic end-effector includes a locomotion device to move the robotic end-effector independent of the robotic arm. The control system is configured to control the robotic arm and the robotic end-effector to detach and attach the robotic arm and the robotic end-effector.

In some variations, the robotic end-effector includes a position detector to monitor a position of the robotic end-effector, and the control system is configured to locate the robotic end-effector based on data from the position detector. in some variations, the position detector includes a camera, and the control system is configured to perform a visual process based on the data from the position detector. The visual process includes inspecting an object, detecting an obstacle, identifying one or more objects about the robotic end-effector, or a combination thereof. In some variations, the robotic end-effector includes a power source to provide power to the robotic end-effector. In some variations, the power source includes a power terminal, a rechargeable battery, a power distribution circuit, or a combination thereof. In some variations, the locomotion device includes one or more wheels, one or more legs, a propeller system, or a combination thereof. In some variations, the control system and the robotic end-effector are communicably coupled via a wired communication link, a wireless communication link, or a combination thereof. In some variations, the robotic arm is a hyper redundant manipulator. In some variations, the robotic end-effector includes a controller communicably coupled to the control system, and the controller is configured to control the robotic end-effector based on command from the control system.

In one form, the present disclosure is directed to a robotic system that includes a robotic arm having multiple degrees of freedom, a robotic end-effector detachably coupled to the robotic arm, and a control system. The robotic end-effector includes a locomotion device to move independent of the robotic arm and a position detector to monitor position of the robotic end-effector. The control system is configured to control the robotic arm and the robotic end-effector to detach and attach the robotic arm and the robotic end-effector.

In some variations, the robotic end-effector includes a power source to provide power to the robotic end-effector. In some variations, the robotic end-effector includes a controller communicably coupled to the control system, and the controller is configured to control the robotic end-effector based on command from the control system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 1A, 1B, and 1C illustrate a robotic system in accordance with the teaching of the present disclosure;

DETAILED DESCRIPTION

Figure 1A:
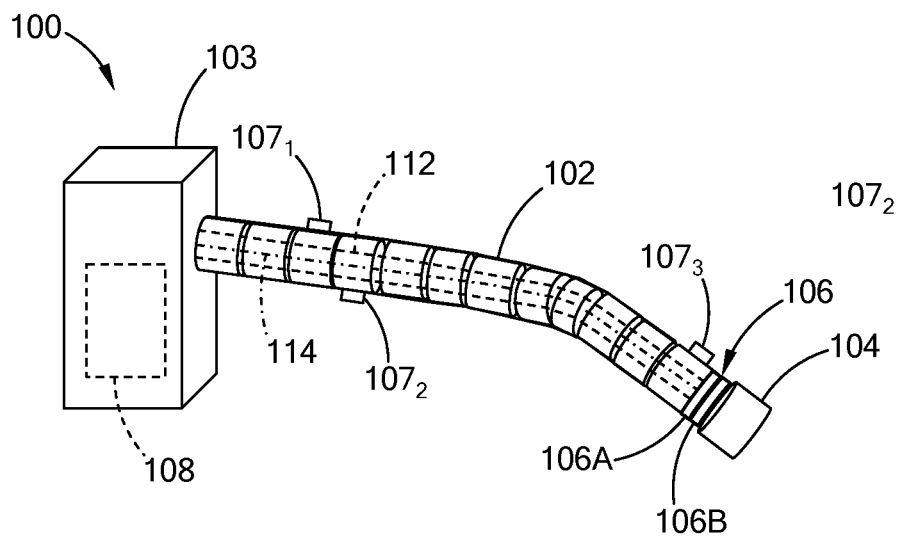

The following description is merely exemplary in nature and is not intended to limit the present disclosure, application, or uses. It should be understood that throughout the drawings, corresponding reference numerals indicate like or corresponding parts and features.

Figure 1B:
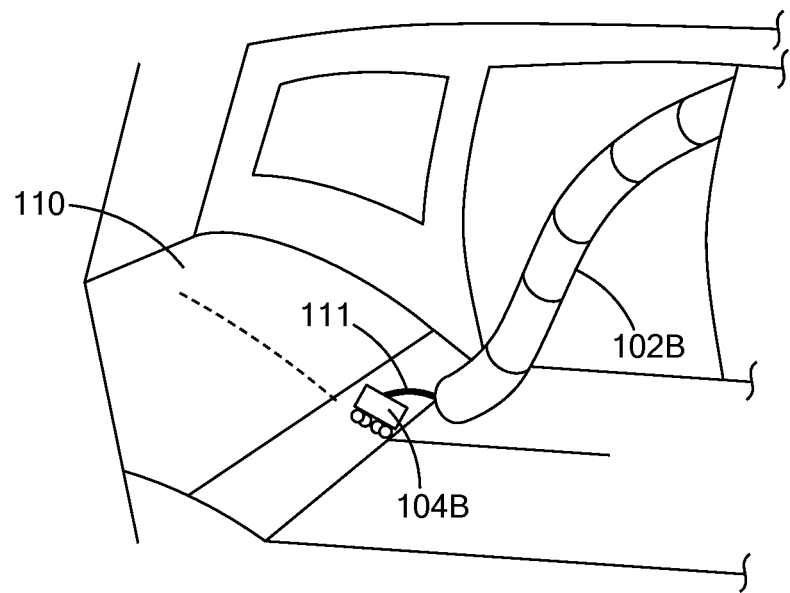
Figure 1C:
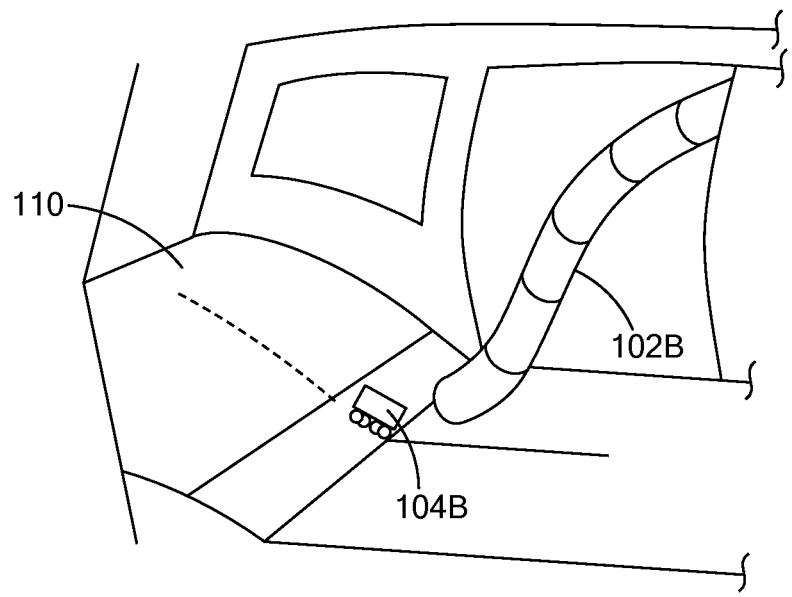

Referring to FIGS. 1A to 1C, a robotic system 100 of the present disclosure includes a robotic arm 102 extending from a base 103, a robotic end-effector 104, a lock 106, one or more position sensors 1071 to 1073 (collectively sensors 107), and a control system 108 to control the robotic arm 102 and the robotic end-effector 104.

As described herein, the robotic end-effector 104 is detachable from the robotic arm 102, and is operable independent of the robotic arm 102. More particularly, in an example application, the robotic system 100 is operable to inspect and/or modify an object 110, such as vehicle floor. For example, the robotic system 100 may deposit a material on the object 110, such as paint, and then inspect the object 110 for any defects, flaws, etc. The robotic end-effector 104 may be detached from the robotic arm 102 to access areas outside the reach of the robotic arm 102. That is, in the detached state, the robotic end-effector 104 is moveable along the object 110 to locations that may not be reachable by the robotic arm 102. FIG. 1A illustrates the robotic end-effector 104 in an attached state. FIG. 1B illustrates a wired configuration between a robotic end-effector 104A and the control system 108 in which the robotic end-effector 104A is detached from a robotic arm 102A with cables 111 extending through the arm 102A to the robotic end-effector 104A. FIG. 1C illustrates a wireless configuration in which a robotic end-effector 104B is detached from a robotic arm 102B with no wires extending therebetween. In the example of FIG. 1C, the control system 108 and the robotic end-effector 104B are communicably coupled via a wireless communication link. Accordingly, in both wired and wireless configuration, the robotic end-effector 104 is moveable and operable independent of the robotic arm 102. Details regarding the end-effector 104 is described further herein. While the object is illustrated as a vehicle floor, the object may a dashboard provided within a vehicle, or other suitable component not limited to a vehicle.

In one form, the robotic arm 102 is a snake-arm robot (e.g., a hyper redundant manipulator) having multiple degrees of freedom to allow the robotic arm 102 to move along a straight path or even in a wave form, like a snake. The robotic arm 102 may be another suitable robot such as an articulated robot, cartesian robot arm, cylindrical robot arm, and/or spherical robot arm. In one form, the robotic arm 102 defines an inner channel 112 for housing cables/wires connected between the control system 108 and the end-effector 104. Alternatively, the cables may be routed along the outside of the robotic arm 102. In one form, the robotic arm 102 is configured to retract/extend the cables based on the movement of the end-effector 104.

In one form, the lock 106 includes an arm interface 106A disposed at the robotic arm 102 and an end-effector interface 106B disposed with the end-effector 104. In one form, the lock 106 is an electronic lock, such as an electromagnetic lock, an electric strike lock, an electronic latch lock. The control system 108 is configured to operate the lock 106 by controlling electric current to the lock 106 and thus, attaching/detaching the robotic end-effector 104 to/from the robotic arm 102. In one form, the lock 106 is integrated with a distal end of the robotic arm 102 and with the end-effector 104.

The position sensors 107 are disposed throughout the robotic system 100 to monitor the work environment and detect obstacles, and to monitor the positions of the robotic arm 102 and the end-effector 104. In one form, the sensors 107 include a camera, an ultrasonic sensor, a laser, a light detection and ranging (LIDAR) device, and/or other suitable sensor. Data from the position sensors 107 is provided to the control system 108 for further processing.

The control system 108 is configured to control the various components of the robotic system 100 to perform one or more tasks, such as inspecting and/or modifying the object 110. In one form, the control system 108 includes a combination of electronic hardware (e.g., microprocessors, non-transitory computer readable memory, transceivers, input/output interface ports, and/or other suitable electronics) and software programs executed able by the microprocessor. The control system 108 may also be communicably coupled to external components, such as a computing device operable by a technician for controlling the robotic system 100, and/or an external server system that collects data to monitor performance of the robotic system 100. In operation, the control system 108 processes the data from the position sensors 107 to control the movement of the robotic arm 102 and the robotic end-effector 104 using one or more software programs stored by the system 108. For example, based on data from the position sensors 107, the control system 108 may detect an obstacle, and then control the robotic arm 102 and/or the robotic end-effector 104 to avoid the obstacle.

Based on the application having the robotic system 100, the control system 108 may be configured to control auxiliary devices required to perform one or more tasks related to the application. For example, in one form, the robotic system 100 applies a fluid (e.g., paint, powder metal, etc.) on a surface of the object 110. More particularly, referring to FIG. 1, the robotic system 100 includes a fluid tube 114 disposed within the inner channel 112 that is connected to a fluid supply (not shown) and to the robotic-end-effector 104. As described below, the robotic end-effector 104 includes a nozzle for dispensing fluid from the fluid tube 114. In this application, the control system 108 is configured to control the amount of fluid being dispensed from the robotic end-effector 104, and inspect the painted area of the object 110 using the position sensor and/or the robotic end-effector 104. The robotic system 100 may be adapted for different applications, and should not be limited to the examples described herein.

Figure 2:
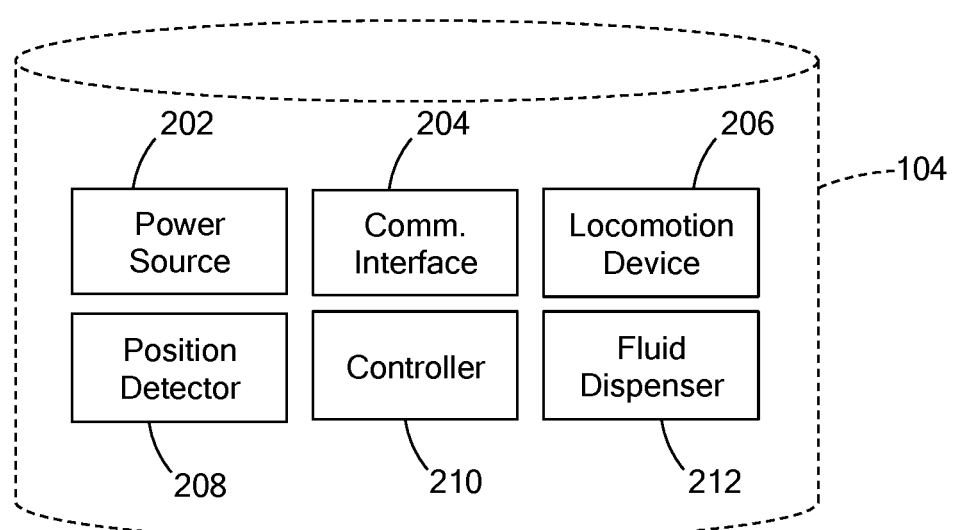
FIG. 2 illustrates a block diagram of a robotic end-effector in accordance with the teaching of the present disclosure.

The robotic end-effector 104 of the present disclosure is configured to operate with and independent from the robotic arm 102. Referring to FIG. 2, in one form, the robotic end-effector 104 includes a power source 202, a communication interface 204, a locomotion device 206, a position detector 208, and a controller 210, The power source 202 provides power to the various electronic components of the robotic end-effector 104. The power source 202 includes, for example, a rechargeable power supply (e.g., a battery) disposed within the end-effector 104, a power distribution circuit connected to power supply via a power cable, a power terminal, or a combination hereof.

The communication interface 204 communicably couples the robotic end-effector 104 to the control system 108. For example, in one form, the communication interface 204 includes an input/output interface (e.g., a port) to connect to a cable/wire that is connected to the control system 108. In another form, the communication interface 204 includes a transceiver to establish wireless communication with the control system 108 via short-range communication link (e.g., BLUETOOTH, ZIGBEE, WI-FI, etc.). In yet another form, the communication interface 204 is configured for both wired and wireless communication, and therefore, includes an I/O interface and a transceiver.

The locomotion device 206 moves the robotic end-effector 104 independent of the robotic arm 102. The locomotion device 206 includes, for example, legs, wheels, and/or a propeller system to move the robotic end-effector 104 along the surface of the object 110, around the object 110, or a combination thereof.

The position detector 208 monitors the position of the robotic end-effector and the environment about the end-effector 104, and may be an extension of the position sensor 107. The position detector 208 may include one or more sensors disposed about the end-effector 104, such as a camera, ultrasonic sensor, a laser, a light detection and ranging (LIDAR), or a combination thereof. Data from the position detector 208 is provided to the controller 210 and/or the control system 108 to perform one or more visual processes, such as aligning the robotic end-effector 104 with the robotic arm 102, determining a location of the robotic end-effector 104, inspecting the object 110, identifying one or more components/obstacles about the robotic end-effector 104, or a combination thereof.

The controller 210 includes a combination of electronic hardware (e.g., microprocessors, non-transitory computer readable memory, and/or other suitable electronics) and software programs executed by the microprocessor. The controller 210 controls the components of the robotic end-effector 104 and is configured to perform various tasks based on the application of the robotic system 100. The controller 210 is communicably coupled to the control system 108 via the communication interface 204 to exchange data with the control system 108. For example, the controller 210 transmits data from the position detector 208 to the control system 108 and receives commands, such as: requesting the end-effector 104 to move to a location along the object 110; having the end-effector 104 inspect an area; dispensing fluid along a selected surface of the object 110; positioning the end-effector 104 with the robotic arm 102 to attach to the robotic arm 102 via the lock 106; and/or requesting the controller 210 to execute a program stored by the controller 210. While specific example operations of the controller 210 is provided, it should be readily understood that the controller 210 can be configured to perform is various suitable ways based on the application of the robotic system 100.

In one form, the end-effector 104 may include auxiliary devices to perform a particular task. For example, in one form, the end effector may include a fluid dispenser 212 for depositing a fluid on the object 110. The auxiliary device may be other suitable device/components, such as a tool for joining components, or an imaging device for inspecting components, and should not be limited to the fluid dispenser 212.

Figure 3A:
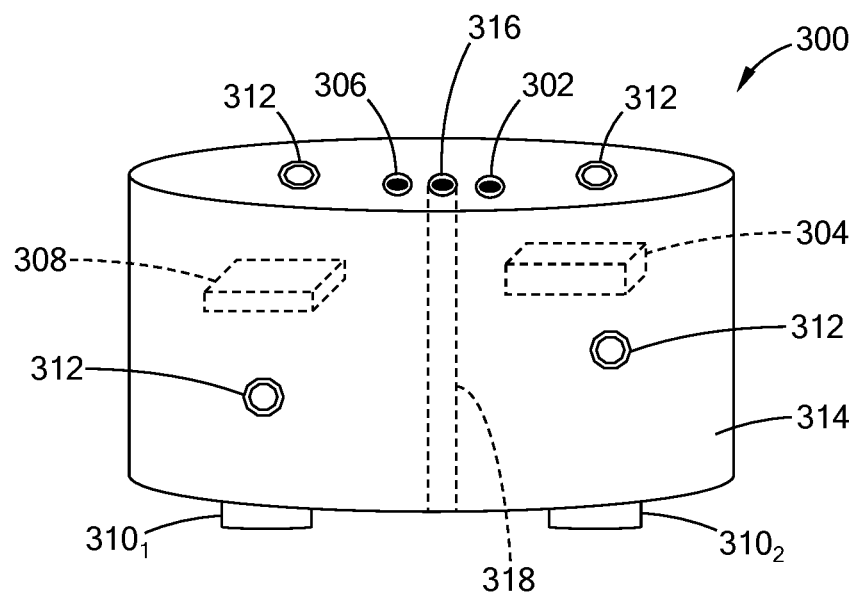
FIGS. 3A and 3B illustrate a first form of a robotic end-effector in accordance with the teaching of the present disclosure.
Figure 3B:
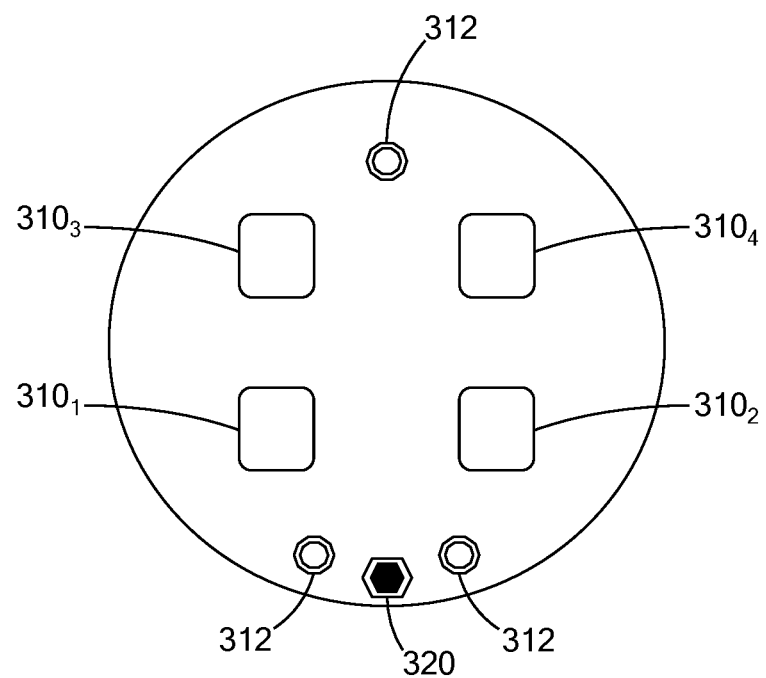

In one form, FIGS. 3A and 3B illustrate a robotic end-effector 300 in accordance with the teaching of the present disclosure. The robotic end-effector 300 is configured to communicate with the control system 108 via a wired communication link and dispense fluid. Here, the power source includes a power terminal 302 to connect to a power cable (not shown) and a power distribution circuit 304 to supply power to components of the end-effector 300 from a power supply (not shown) connected to the power cable. The communication interface includes an I/O port 306 to communicably couple a controller 308 with the control system 108 via a cable (not shown). The locomotion device includes wheels 3101 to 3104 to move the end-effector 300, and in one form, are retractable wheels that extend when the end-effector 300 is detached and retract into a body 314 of the end-effector 300 when attached to the arm. The position detector includes multiple sensors 312 disposed along the body 314 of the end-effector 300 for monitoring the position and the environment of the end-effector 300. The sensors 312 may include a camera, ultrasonic sensor, a laser, a light detection and ranging (LIDAR), or a combination thereof. The location of the sensors 312 along the body 114 should not be limited to the arrangement illustrated. The fluid dispenser includes a fluid port 316 to connect to the fluid supply via a fluid tube, a fluid channel 318 defined within the end-effector 300, and a nozzle 320 connected to an end of the fluid channel 318 to receive and dispense the fluid.

Figure 4:
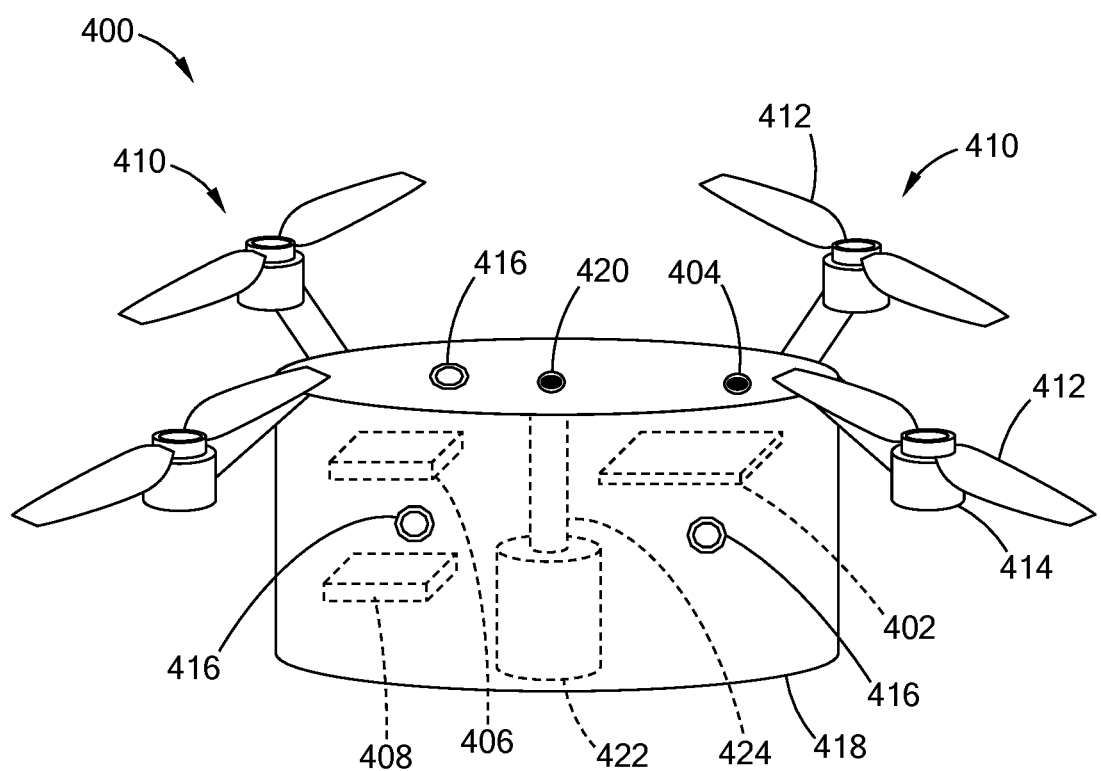
FIG. 4 illustrates a second form of a robotic end-effector in accordance with the teaching of the present disclosure; and The drawings described herein are for illustration purposes only and are not intended to limit the scope of the present disclosure in any way.

Referring to FIG. 4, in another form, a robotic end-effector 400 is configured to communicate with the control system 108 via a wireless communication link and is configured as a drone to include a propeller system. Here, the power source includes a rechargeable battery 402 that is configured to power the components of the end-effector 400 via a power distribution circuit (not shown), and a power terminal 404 that connects to a power cable (not shown) when the end-effector 400 is attached to the robotic arm 102 to charge the battery 402. The communication interface includes a transceiver 406 to communicably couple a controller 408 with the control system 108 via a wireless communication link. The locomotion device includes a propeller system 410 that multiple propellers 412 driven by electric motors 414. The propeller system is controllable by the controller 408. Like end effector 300, the position detector includes multiple sensors 416 disposed along a body 418 for monitoring the position and the environment of the end-effector 400. The fluid dispenser includes a fluid port 420, a reservoir 422 to hold fluid, a fluid channel 424 defined between the port 420 and the reservoir 422, and a nozzle (not shown) fluidly coupled to the reservoir 422 to dispense the fluid. When attached to the robotic arm 102, the fluid port 420 is connected to the fluid tube which supplies fluid to the reservoir 422.

The robotic end-effector of the present disclosure may be configured in other suitable ways and should not be limited to the robotic end-effectors 300 and 400. For example, the robotic end-effector may include legs in lieu of wheel, both a propeller system and legs/wheels, a transceiver and I/O port, and/or no fluid dispenser.

The robotic end-effector of the present disclosure is operable independent of the robotic arm to reach areas of the object not easily accessible by the robotic arm. For example, in one application, in lieu of using wires, the robotic system of the present disclosure is configured to print circuits on body panels using conductive and dielectric paints. The robotic end-effector is configured access openings unreachable by the arm and is movable along multiple dimensions to paint the circuit and/or test the electrical characteristics of the circuit. Accordingly, the robotic system of the present disclosure increases the workable area of the system.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A robotic system comprising:
a robotic arm;
a robotic end-effector detachably coupled to the robotic arm and operable independent of the robotic arm to perform an operation; and
a control system configured to control the robotic arm and the robotic end-effector to detach and attach the robotic arm and the robotic end-effector.

2. The robotic system of claim 1, wherein:
the robotic end-effector includes a position detector to monitor a position of the robotic end-effector, and
the control system is configured to locate the robotic end-effector based on data from the position detector.

3. The robotic system of claim 2, wherein:
the position detector includes a camera, and
the control system is configured to perform a visual process based on the data from the position detector, wherein the visual process includes inspecting an object, detecting an obstacle, identifying one or more objects about the robotic end-effector, or a combination thereof.

4. The robotic system of claim 1, wherein the robotic end-effector includes a locomotion device to move the robotic end-effector independent of the robotic arm.

5. The robotic system of claim 1, wherein:
the robotic end-effector includes a controller communicably coupled to the control system, and
the controller is configured to control the robotic end-effector based on a command from the control system.

6. The robotic system of claim 1, wherein the control system and the robotic end-effector are communicably coupled via a wired communication link, a wireless communication link, or a combination thereof.

7. The robotic system of claim 1, wherein the robotic arm defines an inner channel, and the robotic end-effector is communicably coupled to the control system by way of a cable extending through the inner channel.

8. The robotic system of claim 1, wherein the robotic end-effector includes a power source to provide power to the robotic end-effector.

9. A robotic system comprising:
a robotic arm;
a robotic end-effector detachably coupled to the robotic arm, wherein the robotic end-effector includes a locomotion device to move the robotic end-effector independent of the robotic arm; and
a control system configured to control the robotic arm and the robotic end-effector to detach and attach the robotic arm and the robotic end-effector.

10. The robotic system of claim 9, wherein:
the robotic end-effector includes a position detector to monitor a position of the robotic end-effector, and
the control system is configured to locate the robotic end-effector based on data from the position detector.

11. The robotic system of claim 10, wherein:
the position detector includes a camera, and
the control system is configured to perform a visual process based on the data from the position detector, wherein the visual process includes inspecting an object, detecting an obstacle, identifying one or more objects about the robotic end-effector, or a combination thereof.

12. The robotic system of claim 9, wherein the robotic end-effector includes a power source to provide power to the robotic end-effector.

13. The robotic system of claim 12, wherein the power source includes a power terminal, a rechargeable battery, a power distribution circuit, or a combination thereof.

14. The robotic system of claim 9, wherein the locomotion device includes one or more wheels, one or more legs, a propeller system, or a combination thereof.

15. The robotic system of claim 9, wherein the control system and the robotic end-effector are communicably coupled via a wired communication link, a wireless communication link, or a combination thereof.

16. The robotic system of claim 9, wherein the robotic arm is a hyper redundant manipulator.

17. The robotic system of claim 9, wherein:
the robotic end-effector includes a controller communicably coupled to the control system, and
the controller is configured to control the robotic end-effector based on command from the control system.

18. A robotic system comprising:
a robotic arm having multiple degrees of freedom;
a robotic end-effector detachably coupled to the robotic arm, wherein the robotic end-effector includes a locomotion device to move independent of the robotic arm and a position detector to monitor position of the robotic end-effector; and
a control system configured to control the robotic arm and the robotic end-effector to detach and attach the robotic arm and the robotic end-effector.

19. The robotic system of claim 18, wherein the robotic end-effector includes a power source to provide power to the robotic end-effector.

20. The robotic system of claim 18, wherein:
the robotic end-effector includes a controller communicably coupled to the control system, and
the controller is configured to control the robotic end-effector based on command from the control system.

* * * * *